(12) United States Patent
Macbeth

(10) Patent No.: US 6,628,487 B1
(45) Date of Patent: Sep. 30, 2003

(54) METHOD AND APPARATUS FOR DETECTING UPSTREAM SERIES ARC FAULTS

(75) Inventor: Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 327 days.

(21) Appl. No.: 09/844,016

(22) Filed: Apr. 27, 2001

Related U.S. Application Data

(60) Provisional application No. 60/249,176, filed on Nov. 16, 2000, and provisional application No. 60/199,940, filed on Apr. 27, 2000.

(51) Int. Cl.$^7$ ................................................ H02H 3/00
(52) U.S. Cl. ......................................................... 361/42
(58) Field of Search .............................. 361/42–45, 47, 361/49, 78, 86, 88, 91.1, 100, 101, 102, 115; 324/500, 509, 512, 519–522

(56) References Cited

U.S. PATENT DOCUMENTS

| | | | | |
|---|---|---|---|---|
| 6,229,679 B1 | * | 5/2001 | Macbeth | 361/42 |
| 6,285,534 B1 | * | 9/2001 | Gibson et al. | 361/42 |
| 6,377,055 B1 | * | 4/2002 | Macbeth et al. | 324/522 |
| 6,433,977 B1 | * | 8/2002 | Macbeth | 361/42 |

* cited by examiner

Primary Examiner—Matthew V. Nguyen
(74) Attorney, Agent, or Firm—Wall Marjama & Bilinski LLP

(57) ABSTRACT

Line voltage pulses from an upstream series arc fault are passed through a high pass filter. The filtered output is rectified and used to pulse-charge a capacitor. When the capacitor charge reaches a predetermined threshold, a first switch is activated, which in turn activates an SCR to trigger a circuit interrupting mechanism which interrupts a current to a load, thereby interrupting the upstream series arc fault. A separate detection circuit which requires a DC power supply preferably disables the first switch after a predetermined time after appearance of normal line voltage absent upstream series arcing.

38 Claims, 5 Drawing Sheets

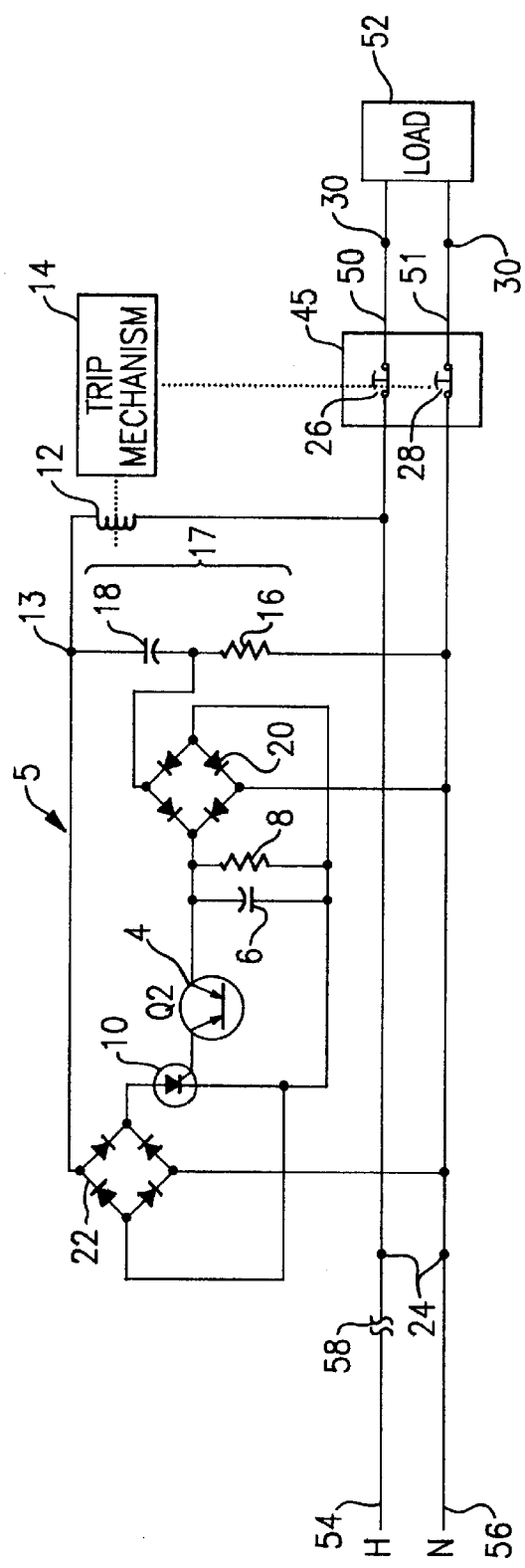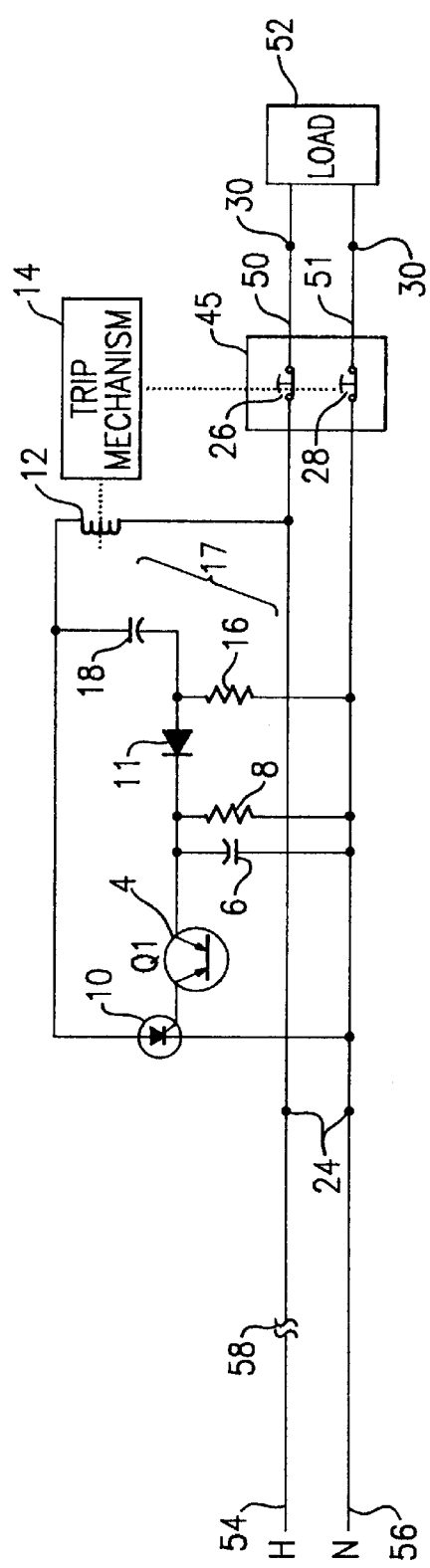
FIG.1A
FIG.1B

METHOD AND APPARATUS FOR DETECTING UPSTREAM SERIES ARC FAULTS

CROSS-REFERENCE TO RELATED APPLICATIONS

This application claims priority from U.S. Provisional Application Ser. No. 60/199,940 filed Apr. 27, 2000 and entitled ARC FAULT CIRCUIT INTERRUPTER WHICH DETECTS UPSTREAM SERIES ARC FAULTS, and from U.S. Provisional Application Ser. No. 60/249,176 filed Nov. 16, 2000 and entitled AFCI WITH UPSTREAM SERIES ARC DETECTOR, both of which are incorporated herein by reference.

FIELD OF THE INVENTION

This invention relates generally to the field of arc fault circuit interrupters, and more particularly to an arc fault circuit interrupter which detects upstream series arc faults during an interval shortly after power is applied to the arc fault circuit interrupter.

BACKGROUND OF THE INVENTION

A percentage of fires each year are caused by electrical branch circuit wiring arcing faults involving currents below the trip level of a conventional circuit breaker or OCPD (over current protection device) as well as below the handling rate of the breaker. Basic overcurrent protection afforded by circuit breakers is designed to prevent $I^2R$ heating of the wiring in the electrical distribution system, caused by circuit overloading or line-to-line faults, and not necessarily arcing faults. A true short circuit is a rarity in an electrical system. In fact, it is more accurate to think of electrical faults as having some level of impedance, such as a high impedance arc fault (low current) or a low impedance fault (high current). Many electrical faults begin as high impedance breakdowns between the line and neutral conductors or to the ground wire or device components. AFCI (Arc Fault Circuit Interrupter) technology affords protection from conditions that may not necessarily be an immediate threat but could become hazardous if left unattended.

In order to start a fire, three elements must be present fuel, oxygen (air), and energy to ignite the fuel. Arcing is defined as a luminous discharge of electricity across an insulating medium. The electrical discharge of an arc can reach temperatures of several thousand degrees Celsius. Arcing produces sufficient energy to reach the ignition point of nearby combustible material(s) before a circuit breaker can respond. Arc detection is an enhancement to thermal magnetic overload detection typically used in circuit breakers or OCPD's, which alone may not detect and respond to arc faults.

A number of devices for detecting arc faults and methods of detection have been used in the past. These include using E and B field arc sensors, detecting the amplitude of the rate of change of current signals when an arc fault occurs, using non-overlapping band pass filters to detect white noise characteristic of arcs, and utilizing the high frequency components (RF) of arcing waveforms to detect arcing faults. While some of these techniques are more or less effective than others, they require relatively sophisticated arc sensors and circuits. Heretofore, most arc detection circuits have been incorporated in circuit breakers.

"A-type" arc faults are those in which the arc occurs across a break in the line or neutral conductors or at a loose terminal in a branch circuit of a distribution network. The conductors are carrying current to a load derived from the line voltage. The arc could likewise occur as a break or at a loose terminal associated with an extension cord deriving power from line voltage, thereby completing the circuit to the load. Since the current through the A-type fault is limited by the impedance of the load itself, since the fault is in series with the load, an A-type fault is also known as a "series fault."

"B-type" arc faults are a second arcing condition that must be detected and interrupted by a combination outlet device. In a B-type fault, the arc occurs across two conductors in the branch circuit or extension cords plugged into it, at a site where the insulating media separating the two conductors has been compromised. The arc may occur across the line and neutral conductors or the line and ground conductors, or in the case of reverse polarity where the line voltage is reverse-polarized, between the neutral and ground conductors. The current through the B-type fault is not limited by the impedance of the load, but rather by the available current from the supply established by the impedance of the conductors and terminals between the source of line voltage and the position of the parallel fault, i.e., the conductive members carrying the fault current. Since B-type faults are effectively across the line, they are also known as "parallel faults."

Many AFCI's depend on an active power supply at the time of an arc fault. One example uses a timer to measure the width of the voltage half waves, since the voltage half waves shrink during an upstream series arc fault. However, when an arc fault occurs simultaneously with the powering up of the AFCI, the power supply is not active and cannot detect the arc fault. This prevents the AFCI from interrupting the load current feeding the series arc quickly enough to prevent ignition of nearby combustibles. In addition, when upstream series arcing is intermittent and has long gaps in-between reappearance of the line voltage on the load side of the series arc, an electronic detection method that depends on a charged power supply is disabled and fails to recognize the arc.

SUMMARY OF THE INVENTION

Briefly stated, line voltage pulses from an upstream series arc fault are passed through a high pass filter. The filtered output is rectified and used to pulse-charge a capacitor. When the capacitor charge reaches a predetermined threshold, a first switch is activated, which in turn activates an SCR to trigger a circuit interrupting mechanism which interrupts a current to a load, thereby interrupting the upstream series arc fault. A separate detection circuit which requires a DC power supply preferably disables the first switch after a predetermined time after appearance of normal line voltage absent upstream series arcing.

According to an embodiment of the invention, a method for detecting and interrupting an upstream series arc fault includes the steps of (a) high pass filtering line voltage pulses from an upstream series arc fault to produce a filtered output; (b) charging a capacitor with pulses from the filtered output; (c) activating a first switch when a charge on the capacitor reaches a predetermined threshold; (d) activating, in response to activation of the first switch, a second switch; and (e) interrupting, in response to activation of the second switch, current to a load, thereby interrupting the upstream series arc fault.

According to an embodiment of the invention, an apparatus for detecting and interrupting an upstream series arc fault includes filtering means for high pass filtering line voltage pulses from an upstream series arc fault to produce a filtered output; charging means for charging a capacitor with pulses from the filtered output; first activation means for activating a first switch when a charge on the capacitor reaches a predetermined threshold; second activation means for activating, in response to activation of the first switch, a second switch; and interrupting means for interrupting, in response to activation of the second switch, current to a load, thereby interrupting the upstream series arc fault.

According to an embodiment of the invention, an arc fault circuit interrupter receiving voltage from an AC power line having at least two line conductors includes line terminals for attaching the interrupter to the line conductors; load terminals for attaching the interrupter to a load, the load terminals being electrically connected to the line terminals; an interrupting mechanism for electrically disconnecting the load terminals from the line terminals; a detector for detecting a harmonic distortion in a voltage at the line terminals, the harmonic distortion being caused by an upstream series arc fault in one line conductor; and an integrator for establishing a duration of the detected harmonic distortion, wherein when the detected harmonic distortion is present for a pre-established duration, the interrupting mechanism trips to electrically disconnect the load terminals from the line terminal whereby a load current passing through the upstream series arc fault is stopped.

According to an embodiment of the invention, an arc fault circuit interrupter receiving voltage from an AC power line having at least two line conductors includes line terminals for attaching the interrupter to the line conductors; load terminals for attaching the interrupter to a load, the load terminals being electrically connected to the line terminals; an interrupting mechanism for electrically disconnecting the load terminals from the line terminals; a detector for detecting a harmonic distortion in a voltage at the line terminals, the harmonic distortion being caused by an upstream series arc fault in one line conductor; an integrator for establishing a duration of the detected harmonic distortion, and a hold circuit responsive to the voltage at the line terminals, wherein the voltage at the line terminals being above a threshold longer than a predetermined time enables the hold circuit, and wherein the enabled hold circuit prohibits the integrator from producing a signal to trip the interrupting mechanism, irrespective of a presence of the harmonic distortion.

According to an embodiment of the invention, an arc fault circuit interrupter receiving voltage from an AC power line having at least two line conductors includes line terminals for attaching the interrupter to the line conductors; load terminals for attaching the interrupter to a load, the load terminals being electrically connected to the line terminals; an interrupting mechanism for electrically disconnecting the load terminals from the line terminals; a detector for detecting a harmonic distortion in a voltage at the line terminals, the harmonic distortion being caused by an upstream series arc fault in one line conductor; an integrator for establishing a duration of the detected harmonic distortion, and a hold circuit responsive to the voltage at the line terminals, wherein the voltage at the line terminals being above a threshold longer than a predetermined time enables the hold circuit, and wherein the enabled hold circuit prohibits the detector from producing a signal to the integrator to trip the interrupting mechanism, irrespective of a presence of the harmonic distortion.

According to an embodiment of the invention, an arc fault circuit interrupter receiving voltage from an AC power line having at least two line conductors includes line terminals for attaching the interrupter to the line conductors; load terminals for attaching the interrupter to a load, the load terminals being electrically connected to the line terminals; an interrupting mechanism for electrically disconnecting the load terminals from the line terminals; an integrator for establishing a duration of the detected harmonic distortion, first and second detectors for detecting a harmonic distortion in a voltage at the line terminals; first and second timers connected to first and second detectors, respectively, to determine if detected harmonic distortions exceed first and second pre-established intervals; first and second hold circuits responsive to a derived voltage derived from the voltage at the line terminals, wherein the first detector and the first timer are enabled by the first hold circuit if the derived voltage is less than a first predetermined threshold, and wherein the second detector and the second timer are enabled by the second hold circuit if the derived voltage is greater than a second pre-determined threshold; and wherein when detected harmonic distortion exceeds the first pre-established interval, the first timer produces a signal to trip the interrupting mechanism, and when detected harmonic distortion exceeds the second pre-established interval, the second timer produces a signal to trip the interrupting mechanism.

BRIEF DESCRIPTION OF THE DRAWINGS

FIG. 1A shows a circuit for an arc fault circuit interrupter according to an embodiment of the invention.

FIG. 1B shows a circuit for an arc fault circuit interrupter according to an embodiment of the invention.

DETAILED DESCRIPTION OF THE PREFERRED EMBODIMENT

Figure 1C:
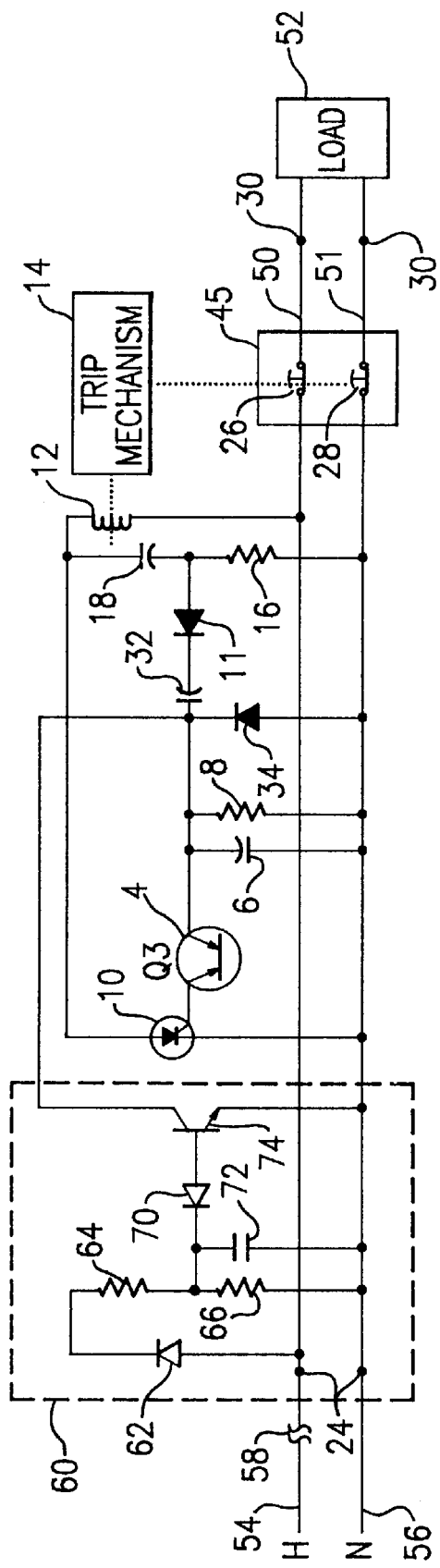
FIG. 1C shows a circuit for an arc fault circuit interrupter according to an embodiment of the invention.

Referring to FIG. 1A, an arc fault circuit interrupter (AFCI) 5 protects an AC power circuit from upstream series arcing. AFCI 5 is connected to a load hot conductor 50 and a load neutral conductor 51 at load terminals 30 and to a line hot wire 54 and a line neutral wire 56 at line terminals 24. AFCI 5 includes a circuit interrupter 45 that includes contacts 26 and 28 to interrupt power to a load 52 in the event of an arc fault. A trip mechanism 14 coupled to a solenoid coil 12 activates circuit interrupter 45 in the event of a fault. Solenoid coil 12 is connected between line hot wire 54 and one AC terminal of a bridge rectifier 22 with the other side of the bridge rectifier 22 AC terminal connected to line neutral wire 56. A switch such as SCR 10 is connected across the plus and minus terminals of bridge rectifier 22 so that when SCR 10 is activated, on either the positive or minus line voltage half wave, line current is drawn into bridge rectifier 22 through solenoid 12 to supply SCR 10 to activate circuit interrupter 45.

Figure 2:
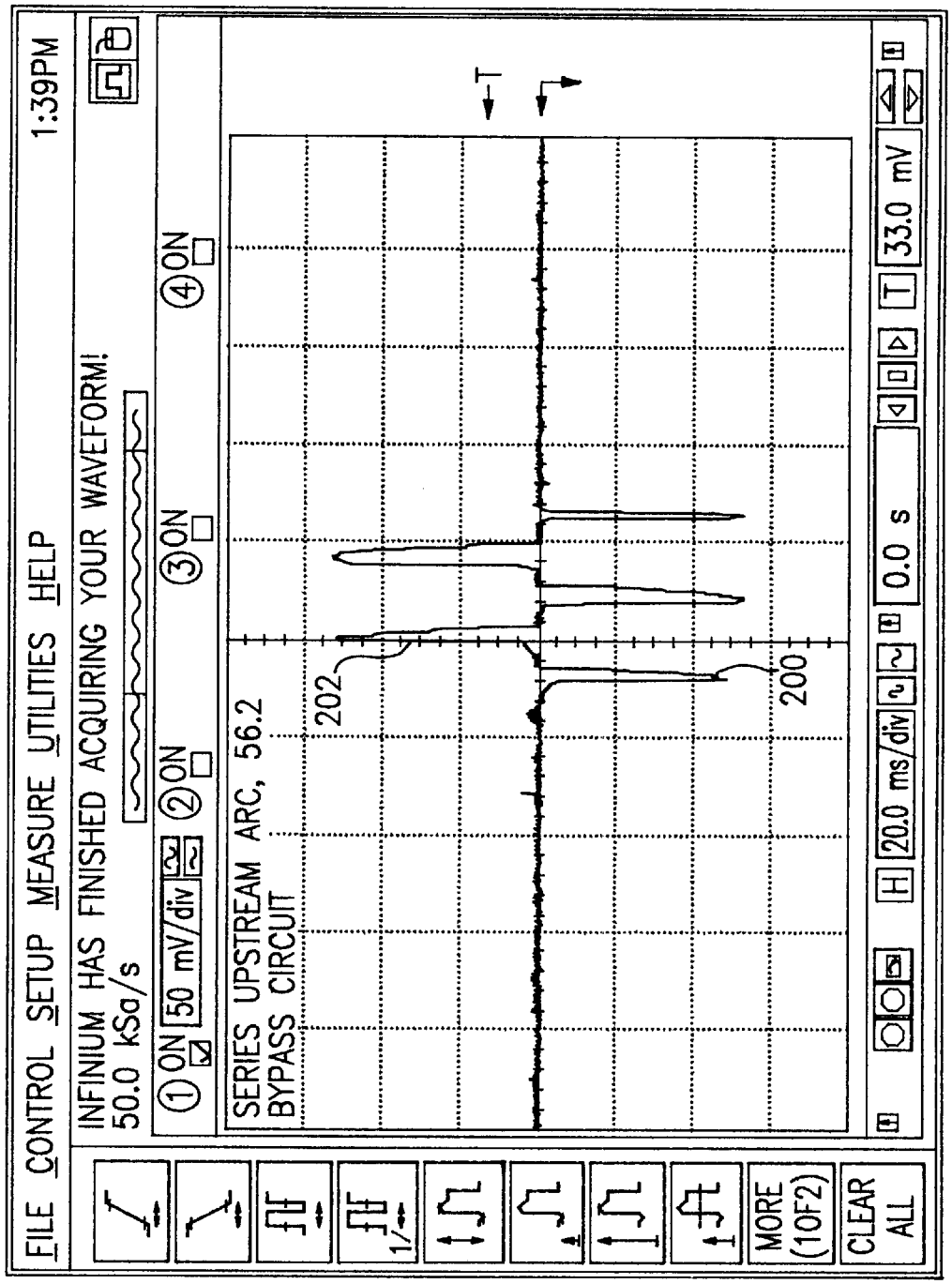
FIG. 2 shows a waveform of arcing voltage pulses used in explaining the embodiments of the invention.

When a series upstream series arc occurs, shown as a hot wire discontinuity 58, but which could be a discontinuity in neutral wire 56, the igniting and extinguishing of the arc fault causes a pulsing line voltage to appear, equaling the line voltage less the voltage of the arc fault, across line terminals 24 with the pattern as shown in waveform 200 of FIG. 2. Waveform 200 is also directly proportional to the resistive load current waveform. Waveform 200 shows a steep dv/dt step 202 which occurs each time the series arc is struck. This stepping dv/dt voltage across line terminals 24 also appears at a node 13 on the detector circuit side of solenoid 12, with solenoid 12 further acting as a noise filter for normal circuit operation. The stepped voltage is applied to a high pass filter 17, preferably consisting of a capacitor 18 and a resistor 16, which acts to filter the normal operational 60 Hz sinusoidal line voltage to a low level, while passing the higher dv/dt of the arc caused voltage step. The voltage steps are rectified by a bridge rectifier 20. The rectified output pulses from bridge rectifier 20 are applied to a pump charge capacitor 6, which pump charges to a diac 4 breakover voltage in a predetermined number of upstream arc caused line voltage steps. When diac 4 reaches its breakover voltage, diac 4 triggers SCR 10, which activates circuit interrupter 45 as described above, thereby interrupting power to load 52 and extinguishing the series upstream arc. A resistor 8 acts as the discharge for capacitor 6 and resets the capacitor. This embodiment does not require a power supply, so the detection circuitry starts responding immediately to arc voltage steps, without the typical delay caused by a power supply filter capacitor charging up to the DC supply voltage.

Referring to FIG. 1B, a second embodiment of the invention is shown in which bridge rectifiers 20 and 22 are omitted. Solenoid 12 is connected between line hot wire 54 and line neutral wire 56 via SCR 10 so that activation of SCR 10 during the positive line half cycle causes line current to pass through solenoid 12 activating circuit interrupter 45 as previously described. High pass filter 17 formed by capacitor 18 and resistor 16 filters out the normal operational 60 Hz sine wave. Positive dv/dt steps in the line voltage from the upstream arc, appearing at line terminals 24, pass through high pass filter 17, are rectified by a diode 11, and pump charge capacitor 6 to the diac 4 trigger voltage in a predetermined number of pulses. Diac 4 triggers SCR 10 causing interruption of the series upstream arc fault. Resistor 8 acts as the discharge for capacitor 6 and acts to reset the capacitor. This embodiment has the disadvantage of only responding to positive steps in line voltage due to the series arc fault, and therefore is slower to charge capacitor 6 than the embodiment of FIG. 1A.

FIG. 1C shows an embodiment which is an improvement over the embodiment of FIG. 1B with an added capacitor 32 and a diode 34 which act to overcome the loss of negative dv/dt steps from the positive rectification of diode 11. On negative dv/dt voltage steps, diode 34 conducts a reverse charge into capacitor 32. This stored charge is pumped along with newly arriving charge from the subsequent positive dv/dt voltage step into pump capacitor 6. In this way, capacitor 6 receives charge from both plus and minus dv/dt voltage steps, speeding up the time it takes for capacitor 6 to charge to the trigger voltage of diac 4. The triggering of circuit interrupter 45 is the same as in the embodiment of FIG. 1B.

FIG. 1C also shows an optional hold-off circuit 60 which disables the detector after a predetermined time interval of steady state line voltage at line input 24. Steady line voltage causes a current to flow through a blocking diode 62 and a voltage divider resistor 64, charging a capacitor 72 towards the breakover voltage of a Zener diode 70. The Zener breakover energizes a base of an NPN transistor 74 so that transistor 74 holds the input to diac 4 low, thereby disabling the detector. A resistor 66 sets the maximum voltage applied to Zener diode 70. In this way, when normal line voltage appears across the line terminals 24 for a predetermined time interval, the arc detector is disabled eliminating any tendency towards nuisance tripping on noisy power lines.

Any of the embodiments of FIGS. 1A, 1B, and 1C may be incorporated into a more sophisticated DC power supply dependent downstream arc detecting AFCI, or into an upstream/downstream arc detecting AFCI. For example, the sophisticated AFCI could act to sense upstream arc faults when the DC power supply is active, making the upstream arc detection technology of the present invention redundant except during the AFCI power up period. This type of AFCI could use hold-off circuit 60 to hold the arc detector of this invention disabled when the DC power supply of the sophisticated AFCI is active. For example, a second back-up series upstream arc detector could be intended to operate in tandem with a first upstream arc detector, and operate only when the first arc detector is inoperative waiting for a power up.

Figure 3:
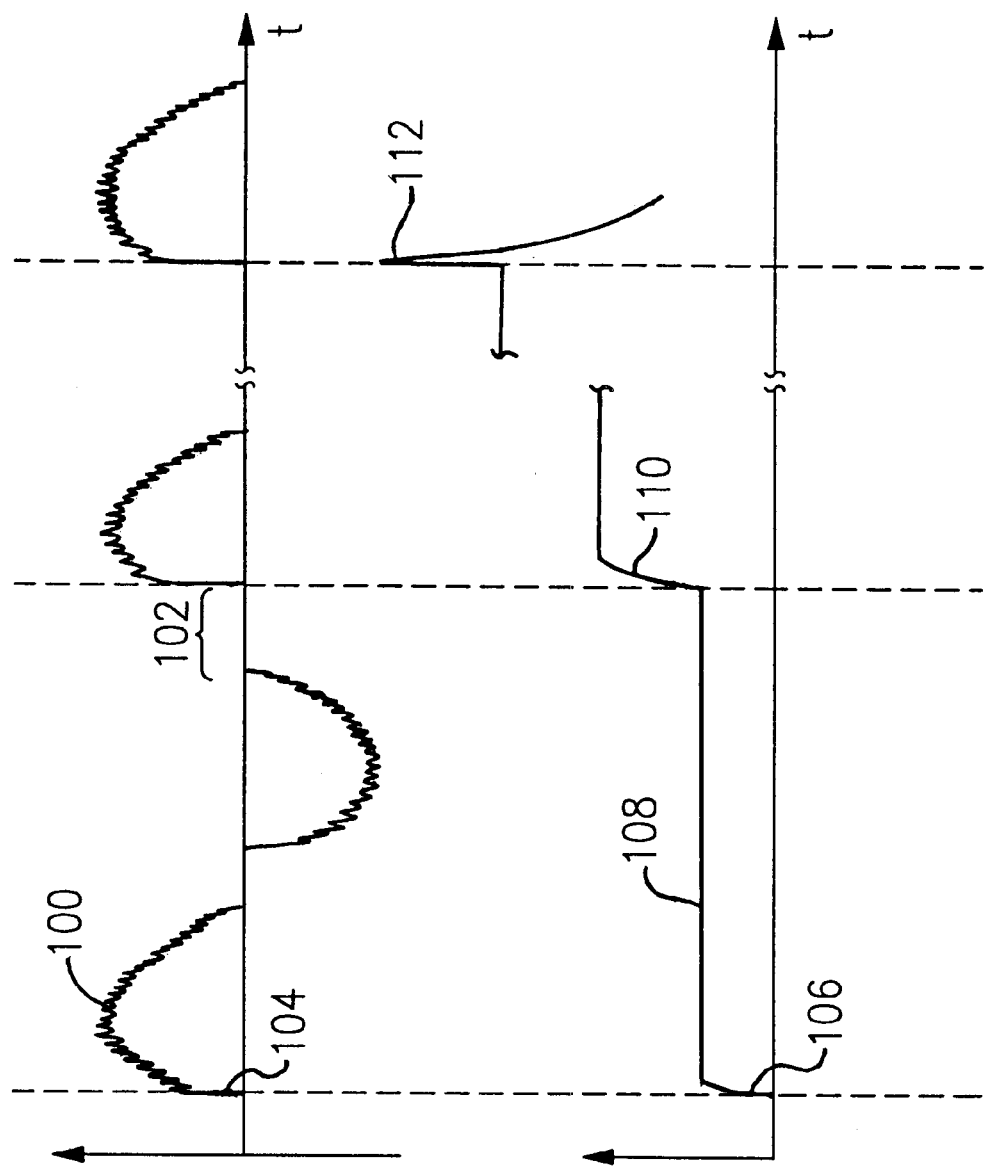
FIG. 3A shows a waveform of a line voltage showing upstream series arcing.
FIG. 3B shows a waveform across a capacitor used in an embodiment of the invention.

Referring to FIG. 3A, a waveform 100 shows the unique line voltage signature in the presence of upstream series arcing. A gap 102 in voltage waveform 100 occurs when the upstream series arc extinguishes. A step in line voltage occurs at a dv/dt edge 104 on waveform 100 when the series upstream arc re-ignites. These steps of the line voltage (dv/dt) during series upstream arcing are used to activate the series upstream arc detector of this embodiment.

Figure 4:
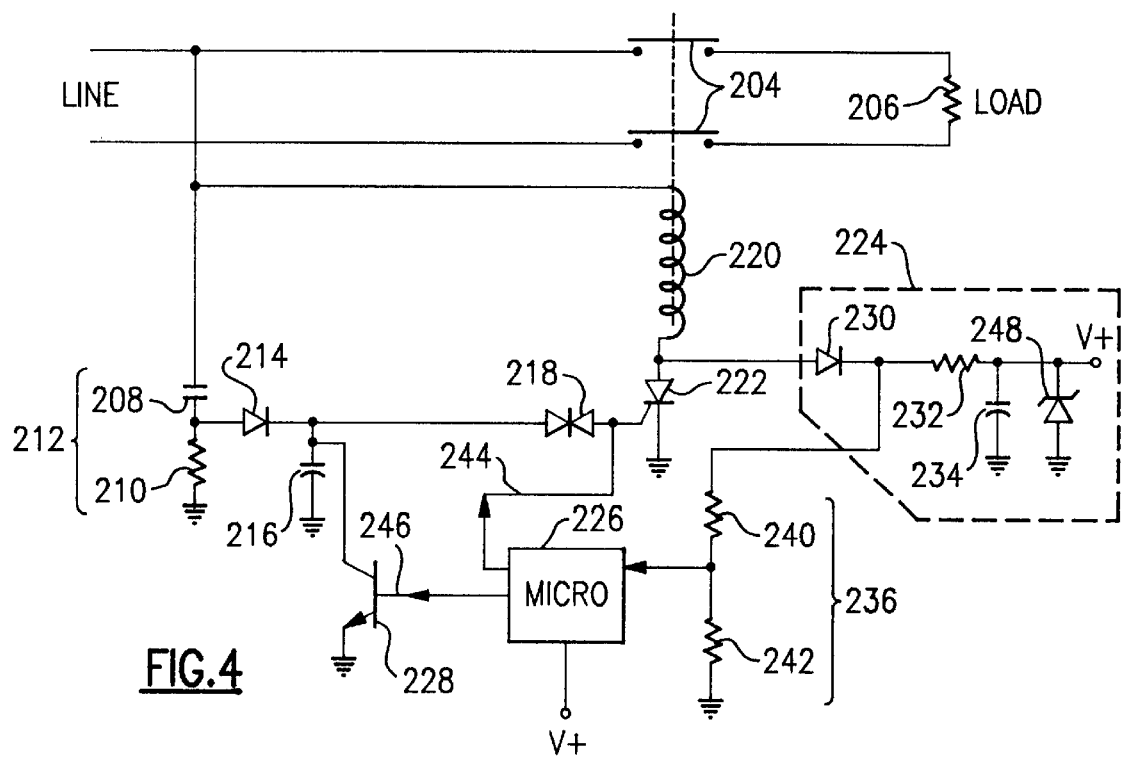
FIG. 4 shows a circuit for an arc fault circuit interrupter according to an embodiment of the invention.

Referring also to FIG. 4, an embodiment of the invention includes a high pass filter 212 which includes a capacitor 208 and a resistor 210 connected across the line. When the dv/dt edge 104 in waveform 100 occurs (FIG. 3A), the dv/dt causes a charging current to pass through capacitor 208 and a rectifying diode 214. The rectified current pulse-charges a capacitor 216. The rise in voltage occurring from the pulse-charge passing into capacitor 216 is shown in a waveform 108 of FIG. 3B at an edge 106. Subsequent positive going dv/dt in waveform 100 (FIG. 3A) continues to pump charge capacitor 216 as shown at an edge 110 on waveform 108. This action continues until the breakover threshold of a diac 218 occurs as shown at a point 112 on waveform 108 (FIG. 3B). Conduction of diac 218 activates a switch such as an SCR 222 which in turn activates a solenoid 220, thereby releasing a plurality of normally closed AFCI contacts 204, interrupting the load current to a load 206, thereby extinguishing the arc. The inductance of solenoid 220 is designed with a low enough value so as not to inhibit the dv/dt of the line voltage. The diac drive circuit preferably includes capacitor 208, resistor 210, diode 214, capacitor 216 and diac 218

During the normal powered up state, a microprocessor 226 is active and samples line voltage across a rectified voltage divider 236 which includes a resistor 240 and a resistor 242. Microprocessor 226 constantly measures the width of the line voltage sample. On occurrence of upstream series arcing, the width of the rectified line voltage half wave shrinks as shown in waveform 100 (FIG. 3A). This width shrinkage is detected by microprocessor 226, which then issues a trip command to SCR 222 via a line 244.

In the normal powered up state, diac 218 must be disabled, or held off, or eventually line voltage transients other than those associated with upstream series arcing will activate high pass filter 212, diode 214, and pump-charge capacitor 216, eventually activating diac 218 and creating false tripping of the device. In order to prevent this, once the microprocessor 226 is powered up, a microprocessor output 246 activates a transistor 228, which shorts pump-charge capacitor 216, thus de-activating diac 218. Microprocessor 226, in its off state, can be considered as a hold circuit. Thus, two hold circuits are optionally used, for example, microprocessor 218 and transistor 228.

In the case of an abnormal power-up, i.e., when a series upstream arc fault starts at the same time as line voltage is applied to the series arc fault, power supply 224 has not yet charged. Therefore, microprocessor 226 along with transistor 228 are disabled, allowing pump-charge capacitor 216 to be charged on the dv/dt pulses occurring from the upstream series arcs. Microprocessor 226 is disabled until such time as power supply 224 (which preferably includes a diode 230, a resistor 232, a capacitor 234, and a Zener clamp 248) reaches a pre-established voltage over a pre-determined time interval. The time interval, typically 0.1 seconds, is established by the value of resistor 232 and capacitor 234, and is intended to be as short as possible while meeting the power requirements of microprocessor 226 and without having an excessively small value for dropping resistance 232, since a small resistance value dissipates a large amount of heat.

In the case of an intermittent or sputtering series upstream arc fault in which the line voltage on the load of the arc fault has too low an RMS voltage to charge power supply 224, microprocessor 226 and transistor 228 are disabled and charge-pump capacitor 216 is enabled to detect and respond to the series arc fault condition. Capacitor 216, having no discharge resistor, acts as a memory for the series upstream arc fault. Capacitor 216 needs to have a charge memory so that series arc events spread over long time intervals are integrated and held, so that the device triggers on "N" number of dv/dt pulses, whether they occur in one cycle or multiple cycles of the power line frequency. When the final "Nth" dv/dt pulse causes the voltage across capacitor 216 to rise in a quick step and exceed the diac trigger, as shown in pulse 112 of FIG. 3B, line voltage is present immediately after the occurrence of the "Nth" dv/dt pulse. Therefore, solenoid 220 in series with SCR 222 has line voltage available at the moment that SCR 222 is triggered, assuring that SCR 222 enables current through solenoid 220 to cause activation of the interrupting contacts 204.

The value of charge-pump capacitor 216 is optionally chosen to respond to a single dv/dt event as shown in FIG. 3B at edge 106, or to any predetermined number of dv/dt pulses. In this manner, the diac drive circuit is able to provide protection from series upstream arc faults for a predetermined time interval after the line voltage is turned on and before the normal mode microprocessor 226 first series arc detector is active. Protection is also provided from sputtering upstream series arc faults that cause the voltage at power supply 224 to be below the threshold that enables the normal mode microprocessor 226 first series arc detector. Otherwise, protection from series upstream arc faults is provided by the microprocessor circuit which preferably includes microprocessor 226 and rectified divider 236, which has the advantage of reduced sensitivity to arc mimicking dv/dt noise than the diac drive circuit. Arc mimicking dv/dt noise could result in nuisance tripping of interrupting contacts 204. An optional additional timer, optionally implemented within microprocessor 226, ensures that microprocessor 226 is on for a pre-determined time interval before activating transistor 228, thus providing additional protection from sputtering or intermittent upstream series arc faults that cause the voltage at power supply 224 to be below the normal operating threshold.

Figure 5:
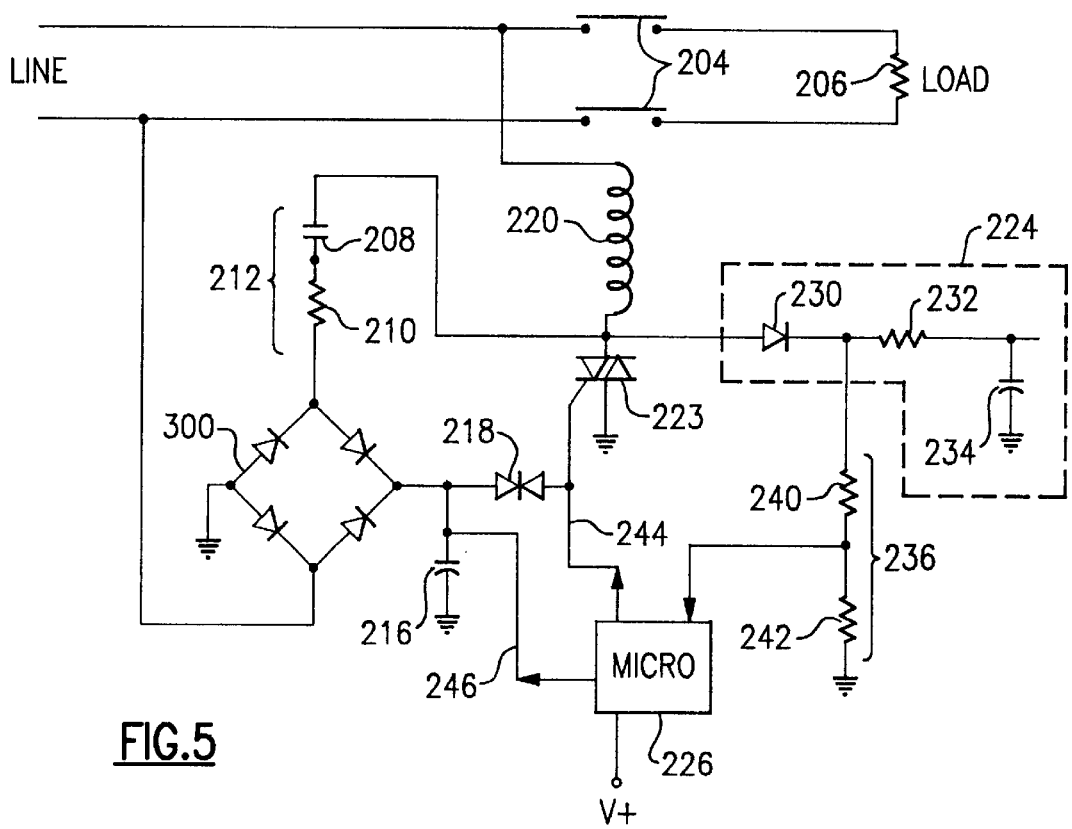
FIG. 5 shows a circuit for an arc fault circuit interrupter according to an embodiment of the invention.

FIG. 5 shows an embodiment similar to the embodiment of FIG. 4. In FIG. 4, the diac drive circuit only responds to the positive dv/dt of the line voltage during series upstream arcing, with the negative dv/dt being blocked by diode 214. In order to produce a faster responding diac circuit, the embodiment of FIG. 5 has diode 214 replaced with a diode bridge 300 which rectifies both the positive and minus dv/dt pulses, and whose pulses charge pulse-charge capacitor 216 in approximately half the time, thereby giving a speedier response. FIG. 5 uses a triac 223 as the solenoid activating switch since capacitor 216 may become charged to the diac trigger voltage on a negative half cycle of the power wave during which period an SCR cannot conduct. Microprocessor 226, rectified divider 236, power supply 224, and transistor 228 provide the same functions and operate in the same manner as previously described with respect to the embodiment of FIG. 4.

The diac 218 function could be accomplished with other devices such as a Zener diode, voltage divider, or the gate threshold of an SCR, or any other voltage level detecting device, including devices that rely on a quickly chargeable, secondary power supply.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for detecting and interrupting an upstream series arc fault, comprising the steps of:

high pass filtering line voltage pulses from an upstream series arc fault to produce a filtered output;

charging a capacitor with pulses from said filtered output;

activating a first switch when a charge on said capacitor reaches a predetermined threshold;

activating, in response to activation of said first switch, a second switch; and interrupting, in response to activation of said second switch, current to a load, thereby interrupting said upstream series arc fault.

2. A method according to claim 1, further comprising the step of disabling said first switch after a predetermined time after appearance of normal line voltage absent upstream series arcing.

3. A method according to claim 2, further comprising the steps of:

sampling line voltage to detect a characteristic signature of said upstream series arc fault; and activating, in response to detection of said characteristic signature of said upstream series arc fault, said second switch, whereby said current to said load is interrupted.

4. A method according to claim 3, wherein the steps of sampling and disabling are at least in part performed by a microprocessor.

5. A method according to claim 4, wherein the step of disabling further includes activating a third switch which shorts said capacitor.

6. A method according to claim 2, wherein the step of disabling is at least in part performed by a hold-off circuit.

7. A method according to claim 1, wherein said pulses from said filtered output are half wave rectified before charging said capacitor.

8. A method according to claim 1, wherein said pulses from said filtered output are full wave rectified before charging said capacitor.

9. An apparatus for detecting and interrupting an upstream series arc fault, comprising:

filtering means for high pass filtering line voltage pulses from an upstream series arc fault to produce a filtered output;

charging means for charging a capacitor with pulses from said filtered output;

first activation means for activating a first switch when a charge on said capacitor reaches a predetermined threshold;

second activation means for activating, in response to activation of said first switch, a second switch; and interrupting means for interrupting, in response to activation of said second switch, current to a load, thereby interrupting said upstream series arc fault.

10. An apparatus according to claim 9, further comprising disabling means for disabling said first switch after a pre-determined time after appearance of normal line voltage absent upstream series arcing.

11. An apparatus according to claim 10, further comprising:

sampling means for sampling line voltage to detect a characteristic signature of said upstream series arc fault; and third activation means for activating, in response to detection of said characteristic signature of said upstream series arc fault, said second switch, whereby said current to said load is interrupted.

12. An apparatus according to claim 11, wherein said sampling means and said third activation means include a microprocessor.

13. An apparatus according to claim 12, wherein said disabling means includes fourth activation means for activating a third switch which shorts said capacitor.

14. An apparatus according to claim 10, wherein said disabling means includes a hold-off circuit which prevents said first activation means from operating.

15. An apparatus according to claim 9, further including means for half wave rectifying said pulses from said filtered output before charging said capacitor.

16. An apparatus according to claim 9, further including means for full wave rectifying said pulses from said filtered output before charging said capacitor.

17. An arc fault circuit interrupter receiving voltage from an AC power line having at least two line conductors, comprising:

line terminals for attaching said interrupter to said line conductors;

load terminals for attaching said interrupter to a load, said load terminals being electrically connected to said line terminals;

an interrupting mechanism for electrically disconnecting said load terminals from said line terminals;

a detector for detecting a harmonic distortion in a voltage at said line terminals, said harmonic distortion being caused by an upstream series arc fault in one line conductor; and an integrator for establishing a duration of said detected harmonic distortion, wherein when said detected harmonic distortion is present for a pre-established duration, said interrupting mechanism trips to electrically disconnect said load terminals from said line terminal whereby a load current passing through said upstream series arc fault is stopped.

18. The arc fault circuit interrupter as in claim 17 wherein said detector is responsive to harmonic distortion indicated by a half cycle voltage duration deviating by a predetermined amount from a pre-determined expected duration of a half period of a power line frequency of said AC power line.

19. The arc fault circuit interrupter as in claim 17, wherein said detector includes only passive components.

20. The arc fault circuit interrupter as in claim 17, wherein said harmonic distortion includes dv/dt voltage pulses.

21. The arc fault circuit interrupter as in claim 20, wherein said integrator is responsive to said dv/dt pulses including a first pulse in a sequence of pulses.

22. The arc fault circuit interrupter as in claim 20, wherein said integrator includes a capacitor for accumulating a stored voltage responsive to said dv/dt pulses, said interrupting mechanism tripping when said stored voltage exceeds a reference voltage.

23. The arc fault circuit interrupter as in claim 22, further comprising a diode in parallel with said capacitor, said diode enabling a detection of said dv/dt pulses in both half cycles of a power line frequency of said power line.

24. The arc fault circuit interrupter as in claim 22, wherein said reference voltage is established with a thyristor.

25. The arc fault circuit interrupter as in claim 24, wherein said thyristor is a diac.

26. The arc fault circuit interrupter as in claim 25, further comprising a full wave rectifier for rectifying said dv/dt pulses in both half cycles of the power line frequency.

27. An arc fault circuit interrupter receiving voltage from an AC power line having at least two line conductors, comprising:

line terminals for attaching said interrupter to said line conductors;

load terminals for attaching said interrupter to a load, said load terminals being electrically connected to said line terminals;

an interrupting mechanism for electrically disconnecting said load terminals from said line terminals;

a detector for detecting a harmonic distortion in a voltage at said line terminals, said harmonic distortion being caused by an upstream series arc fault in one line conductor;

an integrator for establishing a duration of said detected harmonic distortion, and a hold circuit responsive to said voltage at said line terminals, wherein said voltage at said line terminals being above a threshold longer than a predetermined time enables said hold circuit, and wherein said enabled hold circuit prohibits said integrator from producing a signal to trip said interrupting mechanism, irrespective of a presence of said harmonic distortion.

28. The arc fault circuit interrupter as in claim 27, further comprising a DC power supply powering said hold circuit, wherein said hold circuit is not enabled during a period between application of AC power to said line terminals and activation of said DC power supply.

29. An arc fault circuit interrupter receiving voltage from an AC power line having at least two line conductors, comprising:

line terminals for attaching said interrupter to said line conductors;

load terminals for attaching said interrupter to a load, said load terminals being electrically connected to said line terminals;

an interrupting mechanism for electrically disconnecting said load terminals from said line terminals;

a detector for detecting a harmonic distortion in a voltage at said line terminals, said harmonic distortion being caused by an upstream series arc fault in one line conductor;

an integrator for establishing a duration of said detected harmonic distortion, and a hold circuit responsive to said voltage at said line terminals, wherein said voltage at said line terminals being above a threshold longer than a predetermined time enables said hold circuit, and wherein said enabled hold circuit prohibits said detector from producing a signal to said integrator to trip said interrupting mechanism, irrespective of a presence of said harmonic distortion.

30. The arc fault circuit interrupter as in claim 29, further comprising a DC power supply for powering said hold circuit, wherein said hold circuit is not enabled during a period between an application of AC power to said line terminals and an activation of said DC power supply.

31. An arc fault circuit interrupter receiving voltage from an AC power line having at least two line conductors, comprising:

line terminals for attaching said interrupter to said line conductors;

load terminals for attaching said interrupter to a load, said load terminals being electrically connected to said line terminals;

an interrupting mechanism for electrically disconnecting said load terminals from said line terminals;

first and second detectors for detecting a harmonic distortion in a voltage at said line terminals;

first and second timers connected to first and second detectors, respectively, to determine if detected harmonic distortions exceed first and second pre-established intervals;

first and second hold circuits responsive to a derived voltage derived from said voltage at said line terminals, wherein said first detector and said first timer are enabled by said first hold circuit if said derived voltage is less than a first pre-determined threshold, and wherein said second detector and said second timer are enabled by said second hold circuit if said derived voltage is greater than a second pre-determined threshold; and wherein when detected harmonic distortion exceeds said first pre-established interval, said first timer produces a signal to trip said interrupting mechanism, and when detected harmonic distortion exceeds said second pre-established interval, said second timer produces a signal to trip said interrupting mechanism.

32. The arc fault circuit interrupter as in claim 31, wherein said second detector is responsive to harmonic distortion indicated by a half cycle voltage duration deviating by a predetermined interval from an expected half period of a power line frequency of said AC power line.

33. The arc fault circuit interrupter as in claim 31, further comprising a DC power supply for at least one of said first and second detectors, wherein said derived voltage does not exceed said first pre-determined threshold during a period between application of AC power to said line terminals and activation of said DC power supply.

34. The arc fault circuit interrupter as in claim 33, wherein said second detector includes a microprocessor receiving power from said DC power supply.

35. The arc fault circuit interrupter as in claim 34, wherein said microprocessor includes an output terminal that provides a signal to said first hold circuit when said microprocessor is activated by said DC power supply, wherein an absence of said signal enables said first detector and said first timer.

36. The arc fault circuit interrupter as in claim 34, wherein a voltage from said DC power supply being greater than said second pre-determined threshold causes said second hold circuit to enable said second detector and said second timer.

37. The arc fault circuit interrupter as in claim 31, wherein said first detector and said first timer are responsive to harmonic distortion indicated by dv/dt transitions.

38. The arc fault circuit interrupter as in claim 31, further comprising a third timer, wherein maintaining said derived voltage for a period exceeding a third pre-established interval enables said second detector to be responsive to said harmonic distortion, said first detector and said first timer remaining responsive to said harmonic distortion before said period elapses.

* * * * *